United States Patent [19]

Kawakatsu

[11] Patent Number: 5,388,752
[45] Date of Patent: Feb. 14, 1995

[54] METHOD AND APPARATUS FOR SOLDERING A WORKPIECE IN A NON-OXIDIZING GAS ATMOSPHERE

[76] Inventor: Ichiro Kawakatsu, 30-13, 3-chome Saginomiya, Nakano-ku, Tokyo 165, Japan

[21] Appl. No.: 153,999

[22] Filed: Nov. 18, 1993

[30] Foreign Application Priority Data

Apr. 23, 1993 [JP] Japan .................. 5-131492

[51] Int. Cl.6 .................................... H05K 3/34
[52] U.S. Cl. ...................... 228/20.1; 228/37; 228/42
[58] Field of Search ............ 228/180.1, 219, 260, 228/37, 42, 20.1; 118/63

[56] References Cited

U.S. PATENT DOCUMENTS

| | | | |
|---|---|---|---|
| 4,401,253 | 8/1983 | O'Rourke | 228/20.1 |
| 4,451,000 | 5/1984 | Stephens | 228/20.1 |
| 4,496,098 | 1/1985 | Kawakatsu | 228/219 |
| 4,664,308 | 5/1987 | Boynton | 228/20.1 |
| 4,679,720 | 7/1987 | Sedrick, Jr. et al. | 228/20.1 |
| 4,995,411 | 2/1991 | Lowell et al. | 228/20.1 |
| 5,044,542 | 9/1991 | Deambrosio | 228/37 |
| 5,048,746 | 9/1991 | Elliott et al. | 228/37 |
| 5,121,874 | 6/1992 | Deambrosio et al. | 228/37 |
| 5,203,489 | 4/1993 | Gileta et al. | 228/37 |
| 5,240,169 | 8/1993 | Gileta | 228/37 |

*Primary Examiner*—Samuel M. Heinrich
*Attorney, Agent, or Firm*—Birch, Stewart, Kolasch & Birch

[57] ABSTRACT

A method and apparatus for soldering a workpiece in a non-oxidizing gas are achieved by comprising conveyors running in a substantially horizontal direction, for holding and moving a workpiece in the horizontal direction, a flux supplying unit for supplying flux to the workpiece, a solder bath including solder and disposed under the conveyors such that the workpiece with a parting portion parting from the top of solder flow is dipped in the top of solder flow, and jetting unit provided at an exit side of the solder bath with respect to the conveyors and connected to a non-oxidizing gas source, for jetting non-oxidizing gas from the non-oxidizing gas source into a region defined by the parting portion of the workpiece and a vicinity thereof.

11 Claims, 4 Drawing Sheets

METHOD AND APPARATUS FOR SOLDERING A WORKPIECE IN A NON-OXIDIZING GAS ATMOSPHERE

BACKGROUND OF THE INVENTION

1. Field of the Invention

This invention relates to a method and an apparatus for soldering a workpiece in a non-oxidizing gas atmosphere, and more particularly to a method and an apparatus for soldering a workpiece in non-oxidizing gas atmosphere with little consumption of a non-oxidizing gas.

2. Description of the Related Art

In a conventional flow soldering method, Freon has been used to wash off flux residue from a workpiece, such as a printed circuit board after the workpiece had been soldered. In order to avoid using Freon which causes atmospheric pollution, attempts have been made to eliminate this washing step from the soldering process.

One of such attempts is a process wherein soldering is performed by using a flux having a lower solid content and fewer activators than the conventional flux. However, this method causes a problem in that the lowering of the flux concentration leads to poor solderability.

After industrious investigation, the inventor of this invention found that flux residue is reduced so much that it is unnecessary to wash it off when soldering is performed in a non-oxidizing atmosphere. Based on this, he has developed an effective method and apparatus, wherein the whole soldering apparatus is enclosed by a chamber, or the solder bath is surrounded by an enclosure, and wherein non-oxidizing gas, such as $N_2$ gas or an inert gas, is introduced into the chamber or the enclosure to form a non-oxidizing atmosphere therein.

However, the formation of the non-oxidizing atmosphere In the chamber leads to high initial and running costs. On the other hand, it is difficult to lower oxygen concentration in the non-oxidizing atmosphere in the enclosure around the solder bath, failing to obtain good solderability.

As a result of further investigation, the present inventor has arrived at the conclusion that it is sufficient to make the area where the portion of the lower surface of the workpiece and its vicinity comes out of contact with the solder flow be in a non-oxidizing state, without employing the above-mentioned chamber or enclosure, in order to solder the workpiece without the accompanying washing step.

SUMMARY OF THE INVENTION

It is accordingly an object of this invention to provide a method and apparatus for soldering a workpiece in a non-oxidizing atmosphere, in which a non-oxidizing gas is jetted into a region defined by the area where portion of the lower surface of a workpiece is separated from solder in a solder bath, and a vicinity around this area.

In order to achieve this object, one aspect of this invention provides a method for soldering a workpiece in a non-oxidizing atmosphere, which comprises the steps of moving a workpiece in a substantially horizontal running direction, supplying flux to the workpiece, dipping the workpiece in an area of upwelling of solder flow, and jetting non-oxidizing gas from an exit side of movement of the workpiece in the running direction into a region defined by an area of a portion of the lower surface of the workpiece separates from the upwelling of solder flow and a vicinity around this area.

Another aspect of this invention is to provide an apparatus for soldering a workpiece in a non-oxidizing atmosphere, which comprises conveyors running in a substantially horizontal direction, for holding and moving a workpiece in the substantially horizontal direction, a flux supplying unit for supplying flux to the workpiece, a solder bath including molten solder forming an area of upwelling of solder flow and disposed under the conveyors, such that portions of the lower surface of the workpiece separately came into contact with the upwelling of solder flow as the workpiece passes over the solder bath, and a jetting unit provided at an exit side of the solder bath with respect to the conveyors and connected to a non-oxidizing gas source, for jetting non-oxidizing gas from the non-oxidizing gas source into a region defined by the area where the portions of the lower surface of the workpiece come out of contact with the upwelling of solder flow, and the vicinity around this area.

Further scope of applicability of the present invention will become apparent from the detailed description give hereinafter. However, it should be understood that the detailed description and specific examples, while indicating preferred embodiments of the invention, are given by way of illustration only, since various changes and modification within the spirit and scope of the invention will become apparent to those skilled in the art from the detailed description.

DETAILED DESCRIPTION OF THE PREFERRED EMBODIMENTS

This invention will be explained by way of the preferred embodiments with reference to the accompanying drawings.

Figure 1:
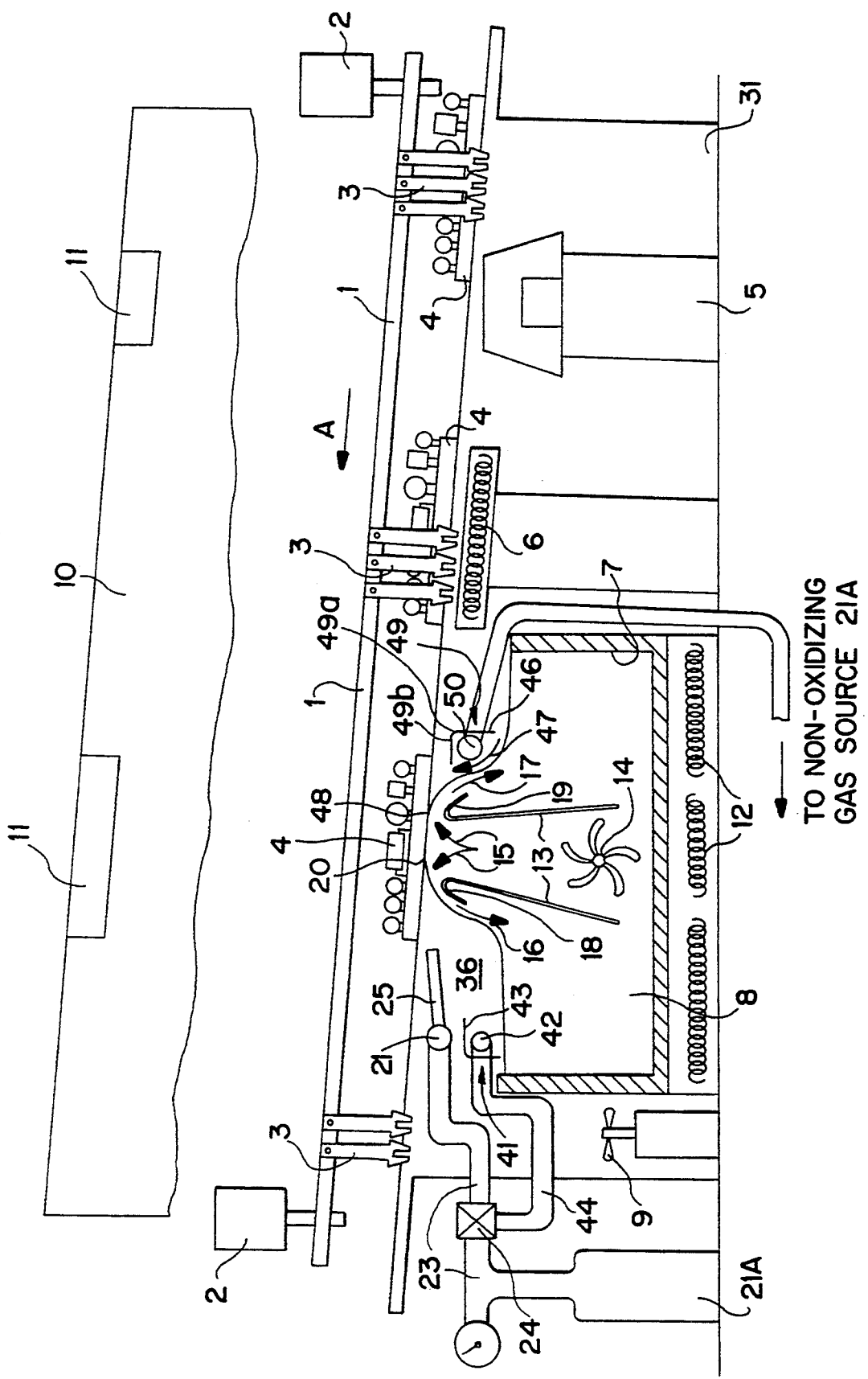
FIG. 1 is a side view of one embodiment of a soldering apparatus according to this invention, with a solder bath being cross-sectioned.

As shown in FIG. 1, an embodiment of the soldering apparatus according to this invention includes a pair of parallel and substantially horizontally extending endless chain conveyors 1 (only one being shown in FIG. 1). The conveyors 1 are cooperatively driven by speed variable motors 2 in the running direction A at a predetermined speed such as 0.5 to 2 meters per minute and is inclined slightly upward toward the exit side thereof, for example, by several degrees. Each conveyor 1 is provided at its outer side with a plurality of continuously arranged fingers 3 which hold workpieces 4 (for example, printed circuit boards) supplied from the upstream side of the conveyor 1 in a horizontal manner.

Under the conveyors 1 are provided a flux supplying unit 5 from which flux is supplied to the workpieces 4, a preheater 6 for heating the workpieces 4 to a predetermined temperature, a solder bath 7 which is filled with molten solder 8 and a fan 9 for cooling soldered workpieces 4, from the entrance side to the exit side of the conveyors 1, in this order. The soldering apparatus is covered with a hood 10 having windows 11 through which the interior of the soldering apparatus can be observed.

Figure 2:
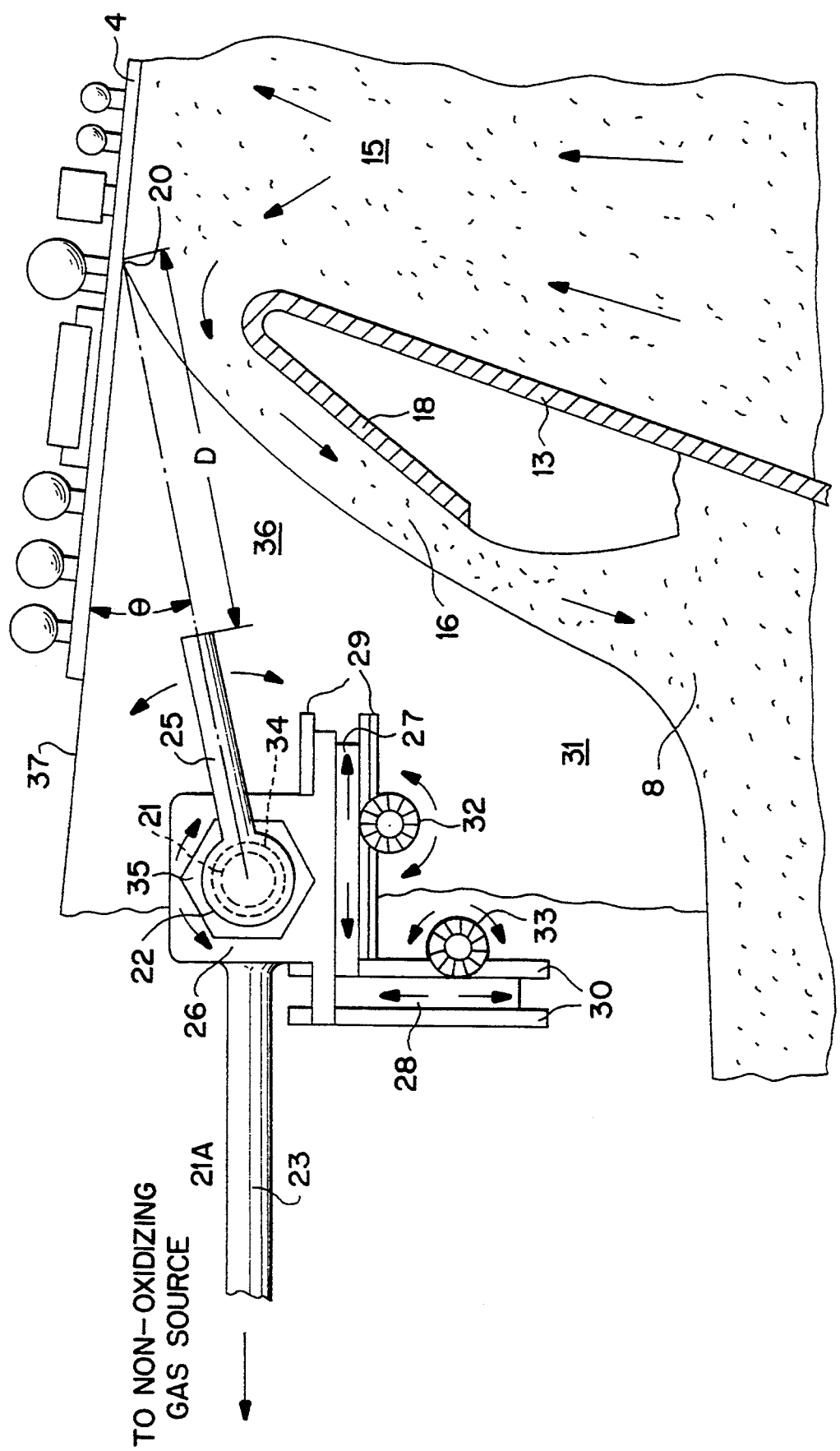
FIG. 2 is a vertical cross-sectional view of a jet nozzle, a solder exit flow and a printed circuit board being soldered of the soldering apparatus of FIG. 1.

Referring to FIGS. 1 and 2, the molten solder 8 in the solder bath 7 is heated by heaters 12 provided in the lower portion of the solder bath 7 so as to be molten and is caused to flow upward in a space defined between upright guide plates 13 by means of the rotation of an impeller 14 in the molten solder 8. The upwelling of solder flow 15 is raised and divided into an exit flow portion 16 and an entrance flow portion 17 and the portions 16 and 17 flow down along guide portions 18 and 19, extending downward from the respective top ends of the guide plates 13, onto the upper surface of the molten solder 8, respectively. The height of the upwelling of solder flow 15 of the molten solder 8 is adjusted such that the workpiece 4 which has arrived at the solder bath 7 contacts the top portion of the upwelling of solder flow 15 of the molten solder 8 and the workpiece 4 has a portion 20 which separates from the upwelling of solder flow 15 (the portion 20 being hereinafter referred to as "the parting portion 20").

Figure 3:
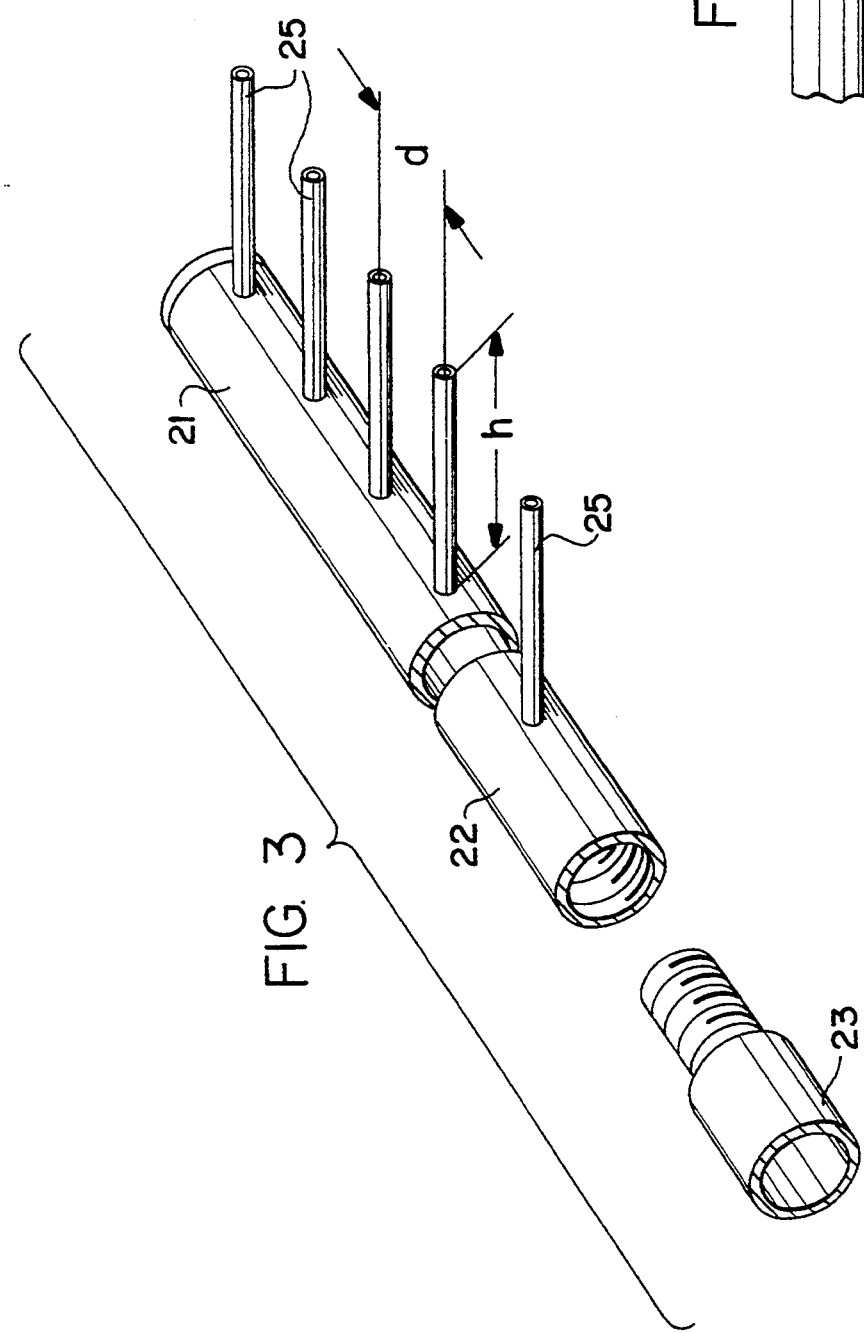
FIG. 3 is a perspective view of the jet nozzle unit shown in FIGS. 1 and 2, with a connecting pipe being disengaged from a pipe member.

Referring to FIGS. 1 to 3, a jet nozzle unit 21 is provided at the exit side of the solder bath 7 with respect to the running direction A of the conveyors 1. Particularly shown in FIG. 3, the jet nozzle unit 21 comprises a pipe member 22 extending transverse of the conveyors 1. An end of the pipe member 22 is closed and the other end thereof is connected to a non-oxidizing gas source 21A which contains a compressed non-oxidizing gas such as $N_2$ (nitrogen) or an inert gas through a connecting pipe 23 and a change valve 24 incorporated with therewith. A plurality of parallel pipe-shaped nozzles 25 extend by a length h perpendicularly from the periphery of the pipe member 22, leaving Intervals d therebetween.

The jet nozzle unit 21 is connected to a nozzle unit block 26 having a horizontal rack 27 extending in the running direction A of the conveyors 1 and a vertical rack 28 which are guided by horizontal guides 29 and vertical guides 30 fixed to the housing 31 of the soldering apparatus, respectively.

The racks 27 and 28 engage pinions 32 and 33 rotatably provided on the housing 31 such that the jet nozzle unit 21 can be moved vertically and/or in the running direction A or in the reverse direction thereto manually or by any other means (not shown). From the closed end of the pipe member 22 extends an adjusting screw 34 rotatably connected to the nozzle unit block 26. An adjusting nut 35 engages the adjusting screw 34 such that the jet nozzles 25 together with the jet nozzle unit 21 can be rotated when the adjusting nut 35 is loosened and the jet nozzle unit 21 is fixed to the nozzle unit block 26 when the adjusting nut 35 is tightened.

It is understood that the combinations of the racks 27 and 28 and the pinions 32 and 33 and the combination of the adjusting screw 34 and the adjusting nut 35 constitute nozzle adjusting means.

In operation, the jet nozzles 25 of the jet nozzle unit 21 are directed to the parting portion 20 of the workpieces 4 to be transported to a position over the solder bath 7 at an angle of θ, such as 15°, inclined downward toward the exit side of the conveyors 1 from their central line 37 by adjusting the height, the horizontal position and the angular position of the jet nozzles 25 of the jet nozzle unit 21 by means of the nozzle adjusting means. Then, the flux supplying unit 5, the preheater 6, heaters 12, the impeller 14 and the fan 9 are started and the change valve 24 is opened. The solder is kept in a molten state by the heaters 12. Then, the conveyers 1 are moved in the running direction A by the motors 2. The workpieces 4 are supplied to the forward ends of the conveyors 1 in succession by means of a workpiece loading device (not shown). Each workpiece 4 is held by the fingers 3 and is moved in the running direction A. First, the workpiece 4 is supplied with flux from the flux supplying unit 5 at the position thereover, and then preheated to a predetermined temperature by the preheater 6 at the position thereover. Thereafter, the workpiece 4 is disposed above the solder bath 7 and dipped in the upwelling of solder flow of the molten solder 8.

Non-oxidizing gas, such as $N_2$ gas or an inert gas, supplied from the non-oxidizing gas source 21A is injected from the jet nozzles 25 into and occupies a region 36 defined by the parting portion 20 and a vicinity thereof such that the non-oxidizing gas expels oxygen from this region. In other words, a non-oxidizing atmosphere is formed in this region 36. Thus, the solder formed on the parting portion 20 of the workpiece 4 is little oxidized, and very little flux residue is produced there, obviating the necessity of any washing step of flux residue after soldering has been completed. Obviously, a non-oxidizing gas forms a stable non-oxidizing atmosphere without using a chamber or enclosure employed in the conventional atmosphere forming means as stated in the description of the prior art. It is a great merit of this invention over the prior art.

After the soldering step has been completed, the workpiece 4 is brought to the position over the fan 9 and cooled there. Finally, the workpiece 4 is unloaded from the conveyors 1 by means of any conventional unloading device (not shown) and is transferred to the succeeding step.

Experiments were made by the inventor of this invention regarding performance of soldering on printed circuit boards. In these experiments, each jet nozzle 25 was made of stainless steel and has outer and inner diameters of 4 millimeters and 3 millimeters, respectively and the length h of 40 millimeters. The jet nozzles 25 were ten in number and their intervals d were 15 millimeters. The distance D between the tips of the jet nozzles 25 and the parting portion 20 of the workpiece 4 which was being soldered was 25 millimeters. The angle of inclination θ of the jet nozzles 25 was 15°. The non-oxidizing gas was $N_2$. The workpieces 4 were printed circuit boards each having a dimension of a length of 150 millimeters and a width of 120 millimeters. The main constituents of the molten solder 8 were 63 wt. % of Sn (tin) and 37 wt. % of Pb (lead).

The experimental results concerning the relationships between the nitrogen gas flow rates at the tips of the jet nozzles 25 and oxygen concentrations in the non-oxidized atmosphere region 36 at the parting portion 20 of the workpiece 4 are shown in Table 1.

TABLE 1

| Nitrogen Gas Flow Rates (liters/min.) | Oxygen Concentration in the Non-oxidizing Atmosphere (%) | Evaluation of Solderability on Printed Circuit Boards |
|---|---|---|
| 10 | 1 | Good |

TABLE 1-continued

| Nitrogen Gas Flow Rates (liters/min.) | Oxygen Concentration in the Non-oxidizing Atmosphere (%) | Evaluation of Solderability on Printed Circuit Boards |
| --- | --- | --- |
| 15 | not more than 1 | Good |

Table 1 shows that an excellent non-oxidizing atmosphere was created in the region 36 at the parting portion 20 of the printed circuit board in each case, such that little flux residue was formed on the soldered portion of the printed circuit board.

Figure 4:
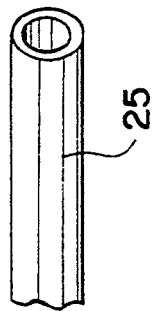
FIG. 4 is a perspective view of a jet nozzle of the jet nozzle unit of FIG. 3.
Figure 5C:
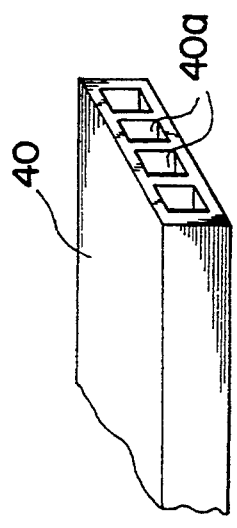
FIGS. 5A to 5C are perspective views of modifications of the jet nozzle.
Figure 5B:
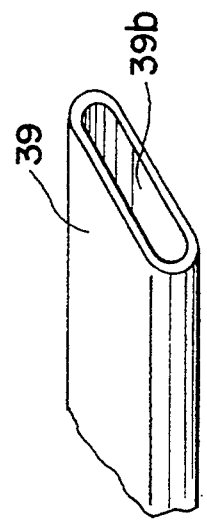
Figure 5A:
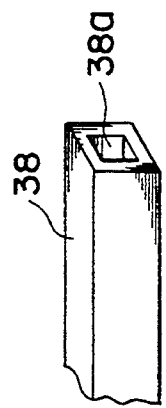

FIGS. 5A to 5C show modifications of the jet nozzle. The jet nozzle 38 shown in FIG. 5A has a square cross section and a jet hole 38a whose cross section is square, and the jet nozzle 37 shown in FIG. 5B has an elliptic cross section and a jet hole 39a with an elliptic cross section. On the other hand, a jet nozzle 40 shown in FIG. 5C is a flat tube with a plurality of jet holes 40a. Any one of them or any other modification can be used in place of the jet nozzle 25 of the FIGS. 3 and 4.

In a second embodiment of the soldering apparatus according to this invention, an auxiliary jet nozzle unit 41 is provided under the nozzle unit 21 and over the upper surface of the molten solder 8, as shown in FIG. 1.

Referring to FIG. 1, the auxiliary jet nozzle 41 comprises a pipe member 42 extending transversely of the conveyors 1, and a guide plate 43 covering the pipe member 42.

One end of the pipe member 42 is closed and the other end thereof is connected to the non-oxidizing gas source 21A through a connecting pipe 44 branched from the connecting pipe 23 at the change valve 24, and the connecting pipe 23.

Figure 6:
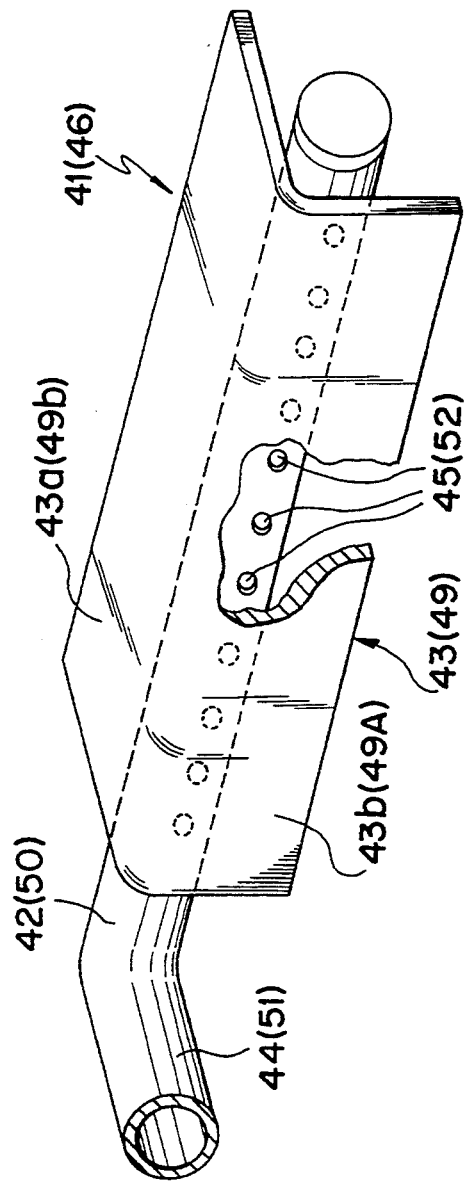
FIG. 6 is a perspective view of another embodiment of a jet nozzle unit.

As shown in FIG. 6, the pipe member 42 is formed on its outer periphery with a plurality of jet holes 45 arranged lengthwise of the pipe member 42 at equal intervals such that the jet holes 45 are directed in the opposite direction to the direction toward the top of solder flow 15 of the molten solder 8.

The guide plate 43 has a horizontal portion 43a and vertical portion 43b and takes an inverted L shape. The guide plate 43 is positioned such that the horizontal portion 43a is positioned over the pipe member 42 and the vertical portion 43b is disposed behind the pipe member 42 with respect to the running direction A of the conveyors 1 in such a manner that tile holes 45 face the vertical portion 43b.

In operation, the non-oxidizing gas jetted from the jet holes 45 hits against the inner surface of the vertical portion 43b and is guided along the vertical portion 43a and the horizontal portion 43b so as to flow toward the top of solder flow 15 of the molten solder 8. Thus, the non-oxidizing atmosphere region 36 is enlarged, thereby further preventing surrounding oxygen from entering the region 36. This ensures formation of a better solder joint on workpieces 4 with less flux residue.

Further experiments were conducted by the inventor of this invention, in which the auxiliary jet nozzle unit 41 was used.

The pipe member 42 was made of stainless steel and had outer and inner diameters of 8 millimeters and 7 millimeters, respectively. The jet holes 45 were ten in number and made of stainless steel and were separated from one after another by 15 millimeters. Each jet hole 45 has a diameter of 3 millimeters. The other conditions were the same as those of the first mentioned experiments.

The experimental results concerning the relationships between the nitrogen gas flow rates at the tips of the jet nozzles 25 and oxygen concentrations in the non-oxidized atmosphere region 36 at the parting portion 20 of the workpiece 4 are shown in Table 2.

Table 2 proves that a more excellent non-oxidizing atmosphere than that formed in the first experiments was created in the region 36 at the parting portion 20 of the printed circuit board in each case. Therefore, less flux residue than in the first experiments was formed on the solder joint of the printed circuit board 4.

TABLE 2

| Nitrogen Gas Flow Rates (liters/min.) | | Oxygen Concentration in the Non-oxidizing Atmosphere (%) | Evaluation of Solderability on Printed Circuit Boards |
| --- | --- | --- | --- |
| Main Jet Nozzle Unit | Auxiliary Jet Nozzle Unit | | |
| 10 | 0 | 1 | Good |
| 10 | 1 | 0.8 | Good |
| 10 | 2 | 0.6 | Excellent |
| 10 | 3 | 0.6 | Excellent |

As shown in FIGS. 1 and 6, a further auxiliary jet nozzle unit 46 having the same structure of the auxiliary jet nozzle unit 41 of the second embodiment is provided in a region 47 defined by the entrance portion 48 of the workpiece 4 into the top of solder flow 15 of the molten solder 8 and its vicinity. The vertical portion 49a of a guide plate 49 is disposed In front of a transverse pipe member 50 connected to the non-oxidizing gas source 21A through a connecting pipe 51. Jet holes are formed in the outer periphery of the pipe member 50 so as to face the inner surface of the vertical portion 49a. The auxiliary jet nozzle unit 46 may be added to the first and second embodiments.

In operation, the non-oxidizing gas jetted out from the jet holes 52 of the pipe member 50 hits against the inner surface of the vertical portion 49a and is guided along the vertical portion 49a and the horizontal portion 49b of the guide plate 49 so as to flow toward the top of solder flow 15 of the molten solder 8 into the region 47. Thus, a non-oxidizing atmosphere is created in this region 47. This forms a larger non-oxidizing atmosphere in the region 47 and ensures more excellent solderability than that given by the first and second embodiments.

It is noted that the jetting means of this invention is applicable not only to a new soldering apparatus designed according to this invention but also to a conventional soldering apparatus with a little modification thereof.

This invention is not limited to the above-described embodiments but is applicable to various modifications within the scope of this invention.

What is claimed is:

1. An apparatus for soldering a workpiece in a non-oxidizing atmosphere, comprising:
   conveyor means running in a substantially horizontal direction, for holding and moving a workpiece in said horizontal direction;
   a flux supplying unit for supplying flux to said workpiece;
   a solder bath including molten solder forming an area of upwelling of solder flow and disposed under said conveyor means such that portions of a lower surface of said workpiece successively come into contact with a portion of said upwelling of solder flow and then out of contact with said upwelling of solder flow as the workpiece passes over the solder bath; and jetting means provided at an exit side of said solder bath with respect to said conveyor means and connected to an non-oxidizing gas source, for jetting non-oxidizing gas from said non-oxidizing gas source into a region defined by the area where the portions of the lower surface of said workpiece come out of contact with said upwelling of solder flow and a vicinity around this area.

2. The apparatus according to claim 1, wherein said jetting means comprises a pipe member extending transversely of said conveyors and connected to a non-oxidizing gas source, and jet nozzle means extending from said pipe member toward said region.

3. The apparatus according to claim 2, wherein said jetting means includes adjusting means for adjusting said jetting means vertically and along said conveyors and adjusting an inclination angle of said jetting means with respect to said conveyors.

4. The apparatus according to claim 2, wherein said jet nozzle means includes a plurality of parallel jet holes directed toward said region.

5. The apparatus according to claim 4, wherein said jet nozzle means comprises a plurality of jet nozzles extending toward said region and each of said jet nozzles includes one of said jet holes.

6. The apparatus according to claim 1, further comprising auxiliary jetting means disposed under said jetting means and connected to said non-oxidizing gas source, for providing additional non-oxidizing gas from said non-oxidizing gas source into said region so as to form a non-oxidizing atmosphere in said region.

7. The apparatus according to claim 6, wherein said auxiliary jetting means comprises a pipe member extending transversely of said conveyors and formed with plurality of jet holes arranged lengthwise of said pipe member and facing in the opposite direction to the direction toward said upwelling of solder flow, and a guide plate comprising a vertical portion facing said jet holes and a horizontal portion disposed over said pipe member of said auxiliary jetting means, for guiding said non-oxidizing gas from said jet holes of said auxiliary jetting means to said region so as to form said non-oxidizing atmosphere in said region.

8. The apparatus according to claim 7, further comprising further auxiliary jetting means disposed on the opposite side of said upwelling of solder flow with respect to said jetting means and said auxiliary jetting means and connected to said non-oxidizing gas source, for providing non-oxidizing gas from said non-oxidizing gas source into a second region defined by the area where the portions of the lower surface of said workpiece come into contact with a portion of said upwelling of solder flow and a vicinity around this area so as to form a further non-oxidizing atmosphere in said second region.

9. The apparatus according to claim 8, wherein said further auxiliary jetting means comprises a pipe member extending transversely of said conveyors and formed with a plurality of jet holes arranged lengthwise of said pipe member of said further auxiliary jetting means and facing in the opposite direction to the direction toward said upwelling of solder flow, and a guide plate comprising a vertical portion facing said jet holes and a horizontal portion disposed over said pipe member of said auxiliary jetting means, for guiding said non-oxidizing gas from said jet holes of said further auxiliary jetting means to said second region.

10. The apparatus according to claim 1, further comprising auxiliary jetting means disposed on the opposite side of said upwelling of solder flow with respect to said jetting means, and connected to said non-oxidizing gas source, for providing non-oxidizing gas from said non-oxidizing gas source into a second region defined by the area where the portions of the lower surface of said workpiece come into contact with a portion of said upwelling so as to form a further non-oxidizing atmosphere in said second region.

11. The apparatus according to claim 10, wherein said auxiliary jetting means comprises a pipe member extending transversely of said conveyors and formed with a plurality of jet holes arranged lengthwise of said pipe member of said further auxiliary jetting means and facing in the opposite direction to the direction toward said upwelling of solder flow, and a guide plate comprising a vertical portion facing said jet holes and a horizontal portion disposed over said pipe member of said auxiliary jetting means, for guiding said non-oxidizing gas from said jet holes of said auxiliary jetting means to said second region.

* * * * *